No. 670,571. Patented Mar. 26, 1901.
I. A. WEAVER.
HANDLE FOR LOCK LEVERS.
(Application filed Dec. 28, 1900.)
(No Model.)
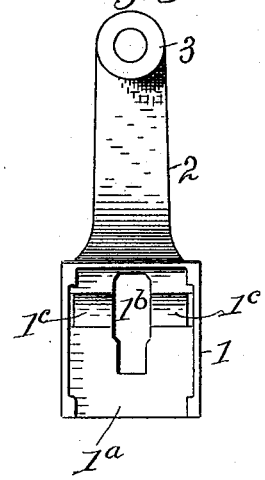
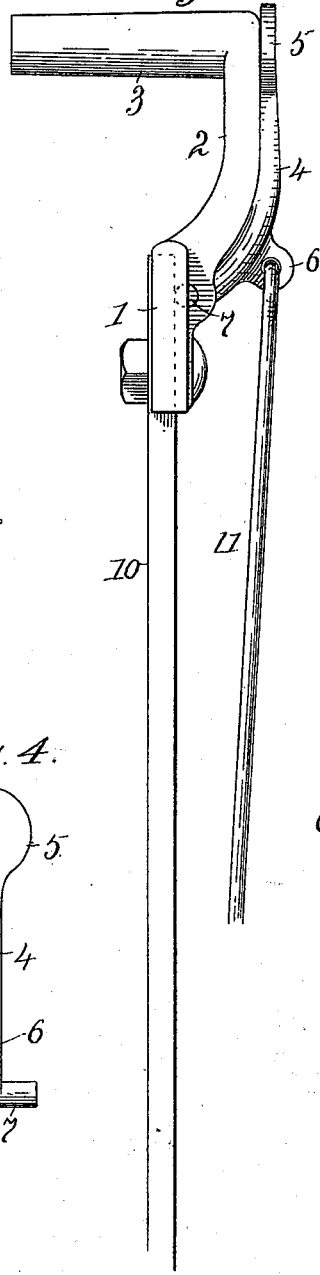
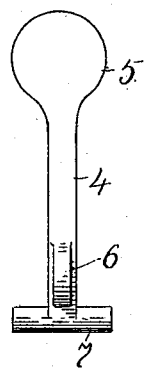
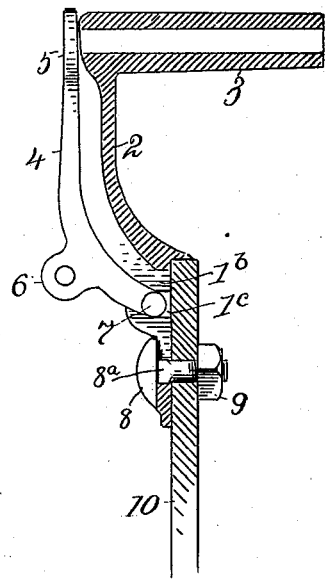
Witnesses.
Nora Graham.
Ina Graham.
Inventor.
Ira A. Weaver,
by L. P. Graham
his attorney

UNITED STATES PATENT OFFICE.

IRA A. WEAVER, OF SPRINGFIELD, ILLINOIS, ASSIGNOR TO SATTLEY MANUFACTURING COMPANY, INCORPORATED, OF SAME PLACE.

HANDLE FOR LOCK-LEVERS.

SPECIFICATION forming part of Letters Patent No. 670,571, dated March 26, 1901.

Application filed December 28, 1900. Serial No. 41,401. (No model.)

*To all whom it may concern:*

Be it known that I, IRA A. WEAVER, of the city of Springfield, county of Sangamon, and State of Illinois, have invented a certain new and useful Handle for Lock-Levers, of which the following is a specification.

This invention is particularly applicable to the lift-levers used in agricultural implements; and it provides a simple and readily-attachable handle and thumb-lever in which the stress is in line with the lever. It is exemplified in the structure hereinafter described, and it is defined in the appended claims.

In the drawings forming part of this specification, Figure 1 is a front or rear elevation of the handle, showing it attached to a lever-bar. Fig. 2 is a section from side to side through the handle and the end of the lock-lever. Fig. 3 is a detail of the handle. Fig. 4 is a detail of the thumb-lever used to actuate the lock of the lock-lever.

The handle comprises a plate 1, recessed, as shown at $1^a$, to receive the end of the lock-lever 10, slotted, as shown at $1^b$, to admit the thumb-lever and grooved, as shown at $1^c$, to form bearings for the cross-pin of the thumb-lever. An arm 2 extends upward from plate 1 and out of alinement with the lock-lever, and a grip member 3 extends from the upper end of arm 2 at right angles therewith and crosses the plate 1 and the upper end of the lever. The slot $1^b$ is central with relation to the plate and lengthwise thereof, and the groove or recess $1^c$ is crosswise of the slot. The arm 2 curves aside a distance approximating one-half the length of the grip member, and so the grip member or handhold 3 is in such position that force applied thereto does not impart side or twisting strain to the lock-lever. The thumb-lever consists of an arm 4, having its upper end 5 flattened and widened to form a bearing for the thumb of the manipulator, a cross-pin 7 on the lower end of the arm to form a pivot, and a lug 6 near the pivot to provide a connection for the rod 11, that actuates the lock-bolt.

The thumb end 5 of the thumb-lever is inserted through the slot of plate 1 from the recessed side thereof and the arm is turned to bring the cross-pin in line with the groove. When the cross-pin is seated in the groove, the plate is fitted onto the end of the lock-lever, as shown in the drawings, and a bolt 8 is inserted through the lower end of the slot and through a hole in the lock-lever and is secured in position by a nut 9. The bolt is square near its head, as shown at $8^a$, and the square part fits in the slot and prevents the bolt from turning while the nut is turned.

The lock-lever holds the cross-pin in the groove of plate 1, the different parts are all secured together by a single bolt, and the slot that admits the thumb-lever also acts as a bolt-hole.

The handle may be used on either side of a lock-lever without any change whatever, and wherever it is placed the thumb-lever is in proper position to be pressed by the thumb of the operator when his hand is on the grip member 3.

I claim—

1. A handle for lock-levers having a plate recessed to fit over an end of the lock-lever such plate being slotted lengthwise and grooved in the recess crosswise of the slot, means for securing the handle to the lock-lever, and a thumb-lever insertible through the slot of the plate and having a cross-pin adapted to pivot in the groove, substantially as described.

2. A handle for lock-levers having a plate recessed to fit over an end of the lock-lever, such plate being slotted lengthwise and grooved crosswise of the slot above the lower end thereof, a thumb-lever insertible through the slot and having a cross-pin adapted to pivot in the groove and a securing-bolt extending through the lower end of the slot and securing the handle to the lock-lever, substantially as described.

3. A handle for lock-levers comprising an arm turned sidewise and extended upward, a grip member on the upper end of the arm extended over the end of the lock-lever at right angles therewith, a plate on the lower end of the arm recessed to fit over the lock-lever, slotted to admit a thumb-lever and grooved crosswise of the slot, a thumb-lever insertible through the slot of the plate and having a cross-pin to pivot in the groove and a securing-bolt extended through the slot and through the lock-lever, substantially as described.

In testimony whereof I sign my name in the presence of two subscribing witnesses.

IRA A. WEAVER.

Witnesses:
 M. E. JENKINS,
 W. E. LEWIS.